Feb. 10, 1959   L. UBEZIO ET AL   2,873,390
HEAVY DUTY ELECTRIC SWITCH
Filed Sept. 20, 1957   2 Sheets-Sheet 1
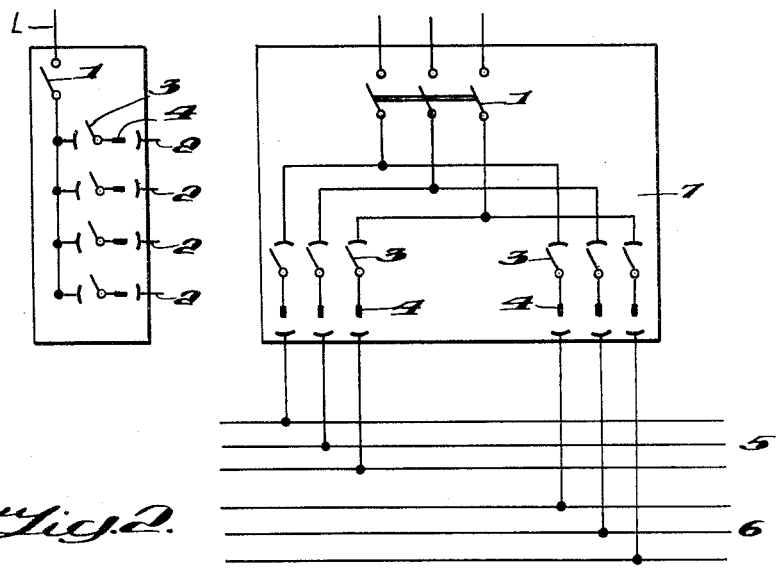
Fig. 1.
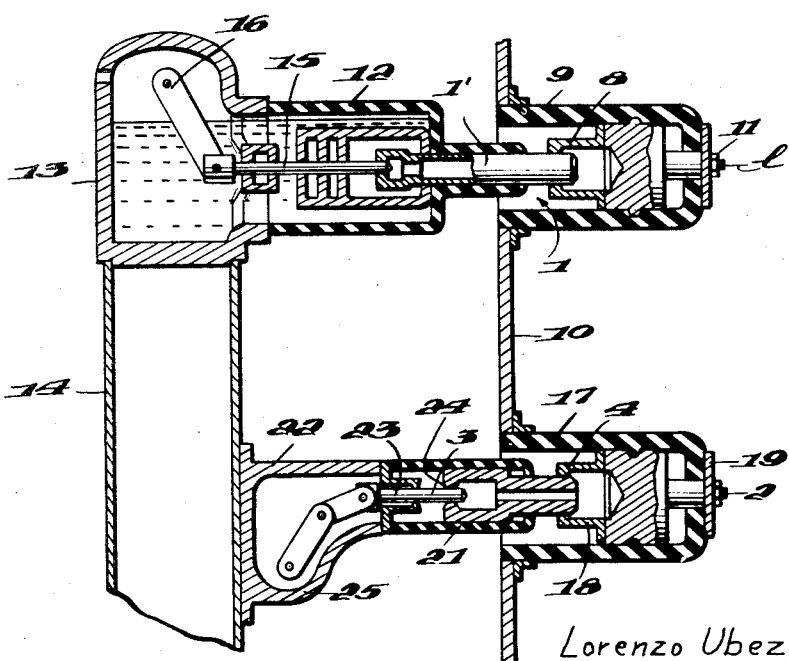
Fig. 2.
Fig. 3
INVENTORS
Lorenzo Ubezio
Hans Thommen
BY Pierce, Scheffler & Parker
ATTORNEYS Feb. 10, 1959  L. UBEZIO ET AL  2,873,390
HEAVY DUTY ELECTRIC SWITCH
Filed Sept. 20, 1957  2 Sheets-Sheet 2

INVENTORS
Lorenzo Ubezio
Hans Thommen

BY Pierce, Scheffler & Parker
ATTORNEYS

United States Patent Office 2,873,390
Patented Feb. 10, 1959

2,873,390

HEAVY DUTY ELECTRIC SWITCH

Lorenzo Ubezio, Wettingen, and Hans Thommen, Baden, Switzerland, assignors to Aktiengesellschaft Brown, Boveri & Cie, Baden, Switzerland, a joint-stock company Application September 20, 1957, Serial No. 685,258

Claims priority, application Switzerland September 18, 1956

8 Claims. (Cl. 307—149)

In the construction of switch systems a principal object is to save space as much as possible without impairing the electrical properties and the accessibility and interchangeability of the equipment. For this reason there have been provided, especially in enclosed switch systems, for example on power switches, plugs which serve at the same time as open disconnecting points. A switch to be inspected is then simply taken out of the switch zone, all sides being accessible, and at the same time the branch itself is de-energized. If the plug is lodged in an insulator, then also inadvertent touching of voltage-carrying parts on the side toward the bus bar is avoided.

Such a power switch consists, therefore, of the actual power switching point and a plug serving as voltage disconnecting point. Switching off may be effected by means of oil or compressed air or other means. This arrangement, however, has the disadvantage that the plugs cannot be opened if the switch remains in its place in the switch system. For this reason these devices are usually limited to systems with single bus bars. For double bus bars, as is known, the disconnecting point must be provided in duplicate, one being switched on and the other off. To render this possible in the known designs, it is necessary to install additionally cover plates or separately arranged disconnecting switches. This, however, entails more space and makes the entire system less economical.

According to the present invention there is now proposed an arrangement in which it is possible, without additional external means, to switch each circuit separately while leaving the entire arrangement in the plugs. This is achieved in that the voltage disconnecting points are combined in a group which consists of a plug as a visible disconnecting point and of an enclosed disconnecting point enabling also the switching off of the operationally flowing currents.

In order, for example, to switch a branch from one bus bar to the other when using double bus bars, it suffices then to switch the enclosed disconnecting points present in the interior of the switch on and off. One has the further advantage of operating several branches through the same switch.

In the accompanying drawings which illustrate the invention:

Fig. 1 is an electrical schematic diagram of a single-pole application of the improved switch structure;

Fig. 2 is also an electrical schematic diagram of a three-pole application of the improved switch structure and with double bus bars;

Fig. 3 is a fragmentary side view in central vertical section of one practical embodiment of the improved switch structure;

Figure 4:
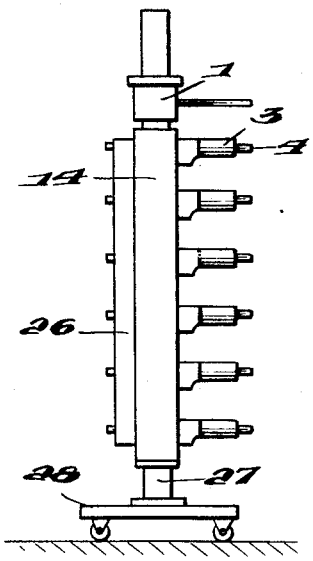
Fig. 4 is a side view in elevation of the improved switch structure having a plurality of branches.

With reference now to the drawings and in particular to Fig. 1 which shows schematically how several circuit branches can be controlled through the same switch it will be seen that the power feed-in occurs at the power switching point 1 and several branches 2 are switched through the voltage disconnecting point groups 3 and 4. Each branch can be operated independently by a separate disconnecting point group. For short-circuits the power switching point 1 must then be released.

Since power cannot be switched off with simple disconnecting switches, it is advantageous to design the enclosed disconnecting points 3 like power disconnecting switches, that is, as voltage disconnecting points which at the same time can switch off also operationally occurring currents.

Fig. 2 shows a circuit arrangement in which a three-pole power switch according to the invention for double bus bars is provided. The two bus bars are marked 5 and 6. A branch or a feed is switched by the power switch 7, which consists of the three-pole power switching point 1 and the two voltage disconnect-point groups 3 and 4. Depending on which bus bar the branch is to be connected to, the enclosed voltage disconnecting points 3 are switched on or off. The plugs 4 remain invariably switched on and are used only when the entire switch is pulled out to be overhauled or inspected.

The practical design of such a power switch is such that the least possible space is required. This is possible in that the enclosed voltage disconnecting points are designed for example as thrust disconnecting switches. These can then be arranged in one line with the plug. It is then possible to provide a relatively large number of voltage disconnecting point groups. This is represented in Fig. 3. Here the power switching point designated 1 is seen to be comprised of a horizontally slidable contact pin 1' which is adapted to enter and make contact with a sleeve contact or socket 8 enclosed within an elongated hollow insulator 9 mounted at the rear face of a panel 10. The connecting terminal 11 for the socket 8 and power lead-in L is mounted externally at the end of insulator 9. The contact pin 1' is slidably mounted within a necked down portion of another hollow insulator 12 so as to engage and be disengaged from the socket 8. Insulator 12 is carried by a hollow head 13 of electrically conductive material mounted atop an elongated, upright, and preferably hollow support member 14 also of electrically conductive material. The interiors of head 13 and insulator 12 communicate with each other and may be oil filled. Mounted within insulator 12 for longitudinal sliding movement thereof is a rod 15 connected at one end to contact pin 1' and articulated at the other end to a crank lever 16. Actuation of the latter will thus cause the rod 15 and contact pin 1' to be moved into the socket 8 or to be withdrawn from the same.

Mounted below insulator 9 on the panel 10 is another insulator 17 of similar construction to insulator 9 and which contains another socket 18 connected to terminal 19 for the branch line 2. The plug contact associated with socket 18 is given the reference numeral 4 shown schematically in Fig. 1 or 2. Plug contact 4 is elongated and is carried partially within an elongated horizontal insulator 21 which is attached to a hollow fitting 22 of electrically conductive material extending laterally from the conductive support member 14. The enclosed disconnecting point is given the reference numeral 3 shown schematically in Fig. 1 or 2. This disconnecting point is comprised of a contact pin 23 mounted for sliding movement longitudinally within the insulator 21 and adapted to enter a socket 24 formed at the opposite end of plug contact 4. The opposite end of contact pin 23 is articulated to linkage 25 which is adapted to be actuated by means not shown, thus to cause contact pin 23 to enter socket 24 and be withdrawn therefrom.

With the parts in the positions shown in Fig. 3, the power lead-in circuit from line L can be traced through terminal 11, socket 8, contact pin 1', rod 15, head 13, support 14, fitting 22, contact pin 23 and socket 24 (forming the enclosed disconnecting point 3 for the branch circuit), plug 4 and socket 18 (constituting the visible disconnecting point) and terminal 19 to branch circuit line 2. If desired, the disconnecting switch point 3 may be designed as a power disconnecting switch, i. e. it may be immersed in oil or operated with compressed air. If operated by compressed air, such air can be produced in known manner by movement of the power disconnecting point 1. The improved switch structure as shown thus requires a minimum of space and the branch circuits 2 can be switched selectively while leaving the plugs 4 in the connected state. For overhaul or inspection, the whole switch assembly as shown in Fig. 3 can be moved bodily to the left thus pulling the plugs 4 out of their sockets 18.

Another objective of the invention now is to make the hollow support 14 as versatile in use as possible. In Fig. 3 it serves as a current connection between the power connecting and the voltage disconnecting points. Now in Fig. 4 it is shown diagrammatically how to such a hollow support several branches can easily be applied which are fed from a power switching point 1. The switching points 3, 4 are not represented in detail, but only their connection with one another. The power switching point 1 is set up perpendicularly to hollow support 14. It can be switched for example with compressed air. All voltage disconnecting points 3 and 4 are likewise set up on the same conductive hollow support member 14, which serves at the same time as a bus bar, so that the current is distributed to the several branches over the voltage disconnecting points by the power switching point 1. Moreover, the actuating mechanism 26 for the various switching points 3, 4 is fastened to the hollow support 14. The hollow support 14 itself rests on a support 27, which is provided for example on a supporting frame 28 mounted on casters. The entire arrangement is represented for one pole of the switch. The other poles can be conceived as being behind it. Therefore, the voltage disconnecting points of the various poles are arranged in a horizontal plane for each branch.

Figure 5:
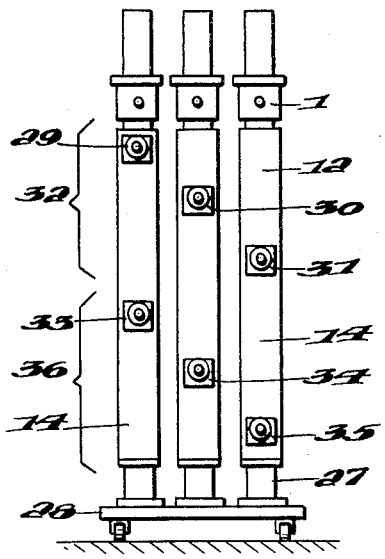
Fig. 5 is a view in end elevation of an embodiment of the invention as applied to a three-pole, double bus bar system.
Figure 6:
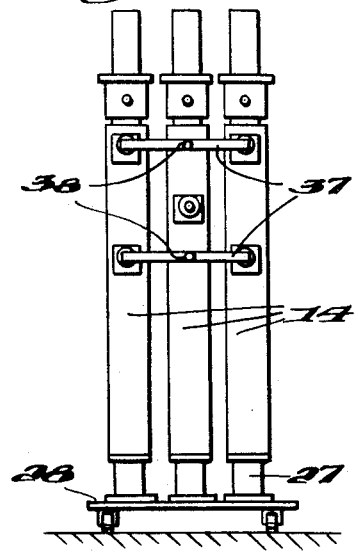
Fig. 6 is also an end elevation of another embodiment of the invention as applied to a three-pole reversing switch system.
Figure 7:
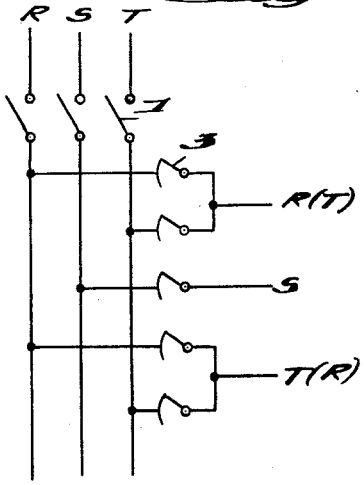
Fig. 7 is an electrical schematic diagram for the switch shown in Fig. 6.

Another design for a switch system with double bus bar system is shown in Fig. 5. Here the view is shown from the front, i. e. from the plug end. The power switching points are indicated at 1. The voltage disconnecting points per bus bar are located in a slanting plane, i. e. the voltage disconnecting points 29, 30, 31 of the various poles belong to bus bar 32, the voltage disconnecting points 33, 34, 35 to the other bus bar 36. Also, in this embodiment the disconnecting points of a pole are set up on the same hollow support 14. Depending on the desired bus bar connection, the enclosed voltage disconnecting points located at 29, 30, 31 or at 33, 34, 35 are operated, without having to pull out the plugs. Another application of the inventive idea is possible in pole reversing switches. This is represented in Figures 6 and 7. Fig. 6 shows the design, Fig. 7 the respective wiring. The three poles R, S, T are connected to the power switching point. Over the enclosed voltage disconnecting points there are applied to the output either the phase sequence R, S, T or T, S, R. Reversal occurs through five voltage disconnecting points, only the connection of pole S remaining unchanged. For example, when the—in the diagram—upper voltage disconnecting point 3 is connected to pole R, and the lower voltage disconnecting point to pole T, then the output is applied to the phase sequence R, S, T. But when the voltage disconnecting points are connected to T above and to R below, then the reversed phase sequence is obtained. The two disconnecting points R and T are each connected by a bar 37 carrying the plug 38. It is possible also to feed two or more branches by way of one power point, and each branch may be poled independently.

The hollow support 14 itself may be used also for the conduction of the compressed air when individual switching points are operated or blown with compressed air. In this case a compressed air tank must be provided at the lower end, located above or below the insulator. Each individual switching point must then be closable by a special valve. In this way they can be operated separately.

The arrangement may also be such that only the power switching point is operated and switched with compressed air, the others by other known methods. Also the hollow support 14 itself may be used as compressed air container, thus eliminating special compressed air tanks.

Another possibility is to provide in these arrangements current transformers or main current releasers at each branch. They are advantageously fastened to the voltage disconnecting point groups themselves. Thus they require no additional space.

The advantage of the arrangement according to the invention is the versatile use of the upright hollow support 14. It can be provided in the same manner in all mentioned cases and for the use of different types of switches. In cases where no compressed air or other materials need be supplied, that is, where the hollow support is to serve only for the attachment of external system parts, it may be replaced by a bus bar of known design, which is then used at the same time as support for these parts.

We claim:

1. In a device for selectively switching each of a plurality of branch circuits to or from a particular pole of a multi-pole electrical supply system, the combination comprising a first set of pin and socket switching members for each of said branch circuits and also for said pole, means mounting one of said switching members of each of said sets in spaced relation on a stationary upright support, means mounting the other of said switching members of each set in a similar spaced relation on a movable upright support whereby said switching members of said first sets may be simultaneously engaged or disengaged by movement of said movable support towards or away from said stationary support, a second set of enclosed separable switching members for and connected in series with each of said first sets of switching members associated with said branch circuits, said second sets of enclosed switching members being mounted on said movable upright support, means electrically connecting said second sets of switching members to that switching member of said first set on said movable upright support which connects with said pole and means for selectively actuating the switching members of said second sets thereby to selectively connect said branch circuits to said pole.

2. A selective switching device as defined in claim 1 wherein said movable upright support is constituted by electrically conductive material and which also serves as said means for electrically connecting said second sets of switching members to that switching member of said first set which connects with said pole.

3. A selective switching device as defined in claim 1 wherein each said second set of switching members is constituted by pin and socket members.

4. A selective switching device as defined in claim 1 wherein each of said second set of switching members is constituted by pin and socket members one of which is structurally integrated with the corresponding series connected switch member of said first set.

5. A plurality of selective switching devices each as defined in claim 1 and arranged in side-by-side relation, each said switching device being electrically connected to a different pole of said electrical supply system and said first sets of switching members for said branch circuits are located at different levels on said movable upright supports.

6. A three-pole switching arrangement as defined in claim 5 wherein each of said switching devices includes a pair of branch circuits, and said first sets of switching members for said branch circuits of all three poles are arranged along a line at an angle to the longitudinal axis of said movable upright supports.

7. A plurality of selective switching devices each as defined in claim 1 and arranged in side-by-side relation, each said switching device being electrically connected to a different pole of said electrical supply system and said first sets of switching members for said branch circuits being located at the same level on said movable upright supports.

8. In a device for switching a branch circuit to or from a particular pole of an electrical supply system, the combination comprising a first set of pin and socket switching members for said branch circuit and a similar first set of pin and socket switching members for said pole, means for mounting one of said switching members of each of said sets in spaced relation on a stationary support, means mounting the other of said switching members of each set in a similar spaced relation on a movable upright support whereby said switching members of said first sets may be simultaneously engaged or disengaged by movement of said movable support towards or away from said stationary support, a second set of enclosed separable switching members for and connected in series with said first set of switching members associated with said branch circuit, said second set of switching members being mounted on said movable upright support, means electrically connecting said second set of switching members to that switching member of said first set on said movable upright support which connects with said pole, and means for actuating said switching members of said second set thereby to connect and disconnect said branch circuit relative to said pole.

References Cited in the file of this patent

UNITED STATES PATENTS 2,025,653    Dyer ------------------ Dec. 24, 1935